United States Patent [19]

O'Connell et al.

[11] Patent Number: 4,968,046
[45] Date of Patent: Nov. 6, 1990

[54] LIGHTWEIGHT AMPHIBIOUS WATER-ONTO-ICE RESCUE SLED

[76] Inventors: Michael J. O'Connell, 13 Dartmouth Cir., P.O. Box 451, Pembroke, Mass. 02359; Donald S. Caramanica, 76 Maple St., Plympton, Mass. 02367

[21] Appl. No.: 372,276

[22] Filed: Jun. 27, 1989

Related U.S. Application Data

[63] Continuation-in-part of Ser. No. 250,085, Sep. 28, 1988, abandoned.

[51] Int. Cl.$^5$ .............................................. B62B 15/00
[52] U.S. Cl. ................................... 280/12.11; 280/19; 114/43; 441/82; 441/88
[58] Field of Search ...................... 280/845, 12.1, 12.11, 280/16, 18, 18.1, 19, 600, 219; 114/43, 62, 63, 266, 270, 356; 441/68, 79, 82, 88, 136

[56] References Cited

U.S. PATENT DOCUMENTS

| | | | |
|---|---|---|---|
| 414,459 | 11/1889 | Thomas | 280/12.11 |
| 816,681 | 4/1906 | Piller | 441/82 |
| 1,401,275 | 12/1921 | Mulock | 280/12.11 |
| 2,735,690 | 2/1956 | Paden et al. | 280/18 |
| 3,137,261 | 6/1964 | Noe | 114/62 X |
| 3,179,961 | 4/1965 | Ward et al. | 114/356 X |
| 3,355,186 | 11/1967 | Bradley | 280/19 |
| 3,532,066 | 10/1970 | Clemans | 114/43 |
| 3,711,879 | 1/1973 | Siefert | 114/43 X |
| 3,916,466 | 11/1975 | Davidson et al. | 114/356 |
| 4,060,865 | 12/1977 | Woolworth | 114/356 |
| 4,079,953 | 3/1978 | Howorth, Jr. | 280/19 |
| 4,517,911 | 5/1985 | Seefeld | 114/63 X |
| 4,739,722 | 4/1988 | Rogstad | 114/356 |

Primary Examiner—Charles A. Marmor
Assistant Examiner—Brian L. Johnson
Attorney, Agent, or Firm—Donald W. Meeker

[57] ABSTRACT

Foam is sandwiched between baffles and two sheets of low friction enameled aluminum. The aluminum is bent to form waterproof seams between the sheets along the top edge and small runners along the bottom sheet. The body of the sled is shoulder width and narrow in depth to permit easy and rapid manual propulsion over ice and in water. All seams are riveted together, a top edge seam is a waterproof standing seam and the others are silicone treated for waterproofing. Side handles are secured to the body for carrying the sled. A hand-held combination ice grab and water paddle is secured to each side rail for propelling the sled. A front grasping rail is secured by protrusions from the front of the sled for the rescue. A harness cord with a snap hook at both ends is secured to the protrusions for harnessing the victim to the sled if necessary. A long tow line is attached to a rear hook.

10 Claims, 1 Drawing Sheet

U.S. Patent    Nov. 6, 1990    4,968,046
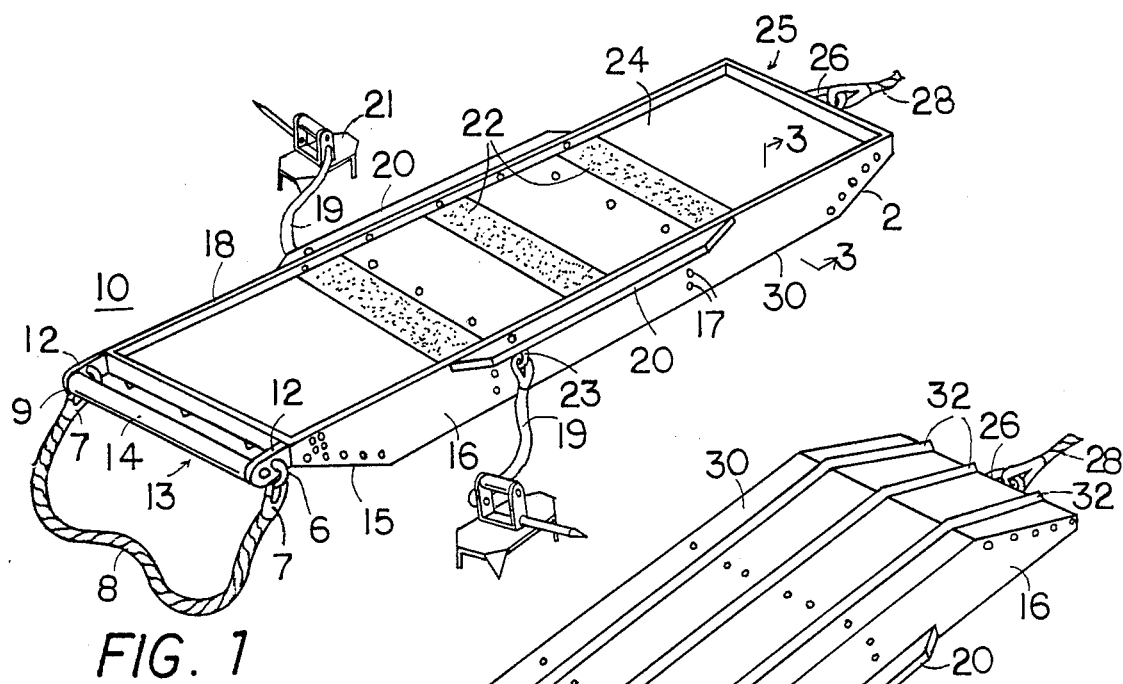
FIG. 1
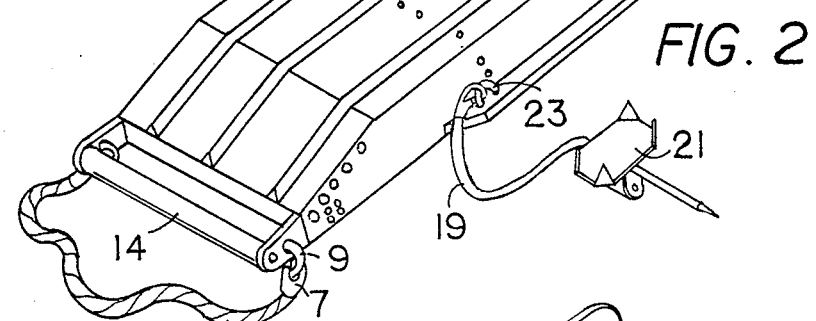
FIG. 2
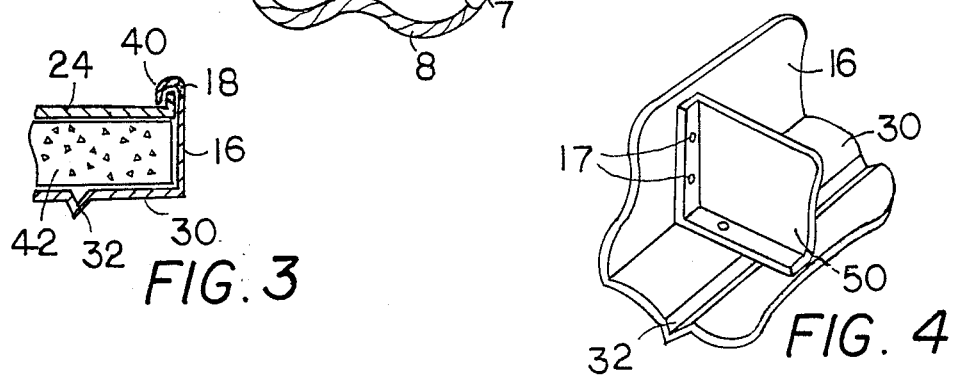
FIG. 3
FIG. 4
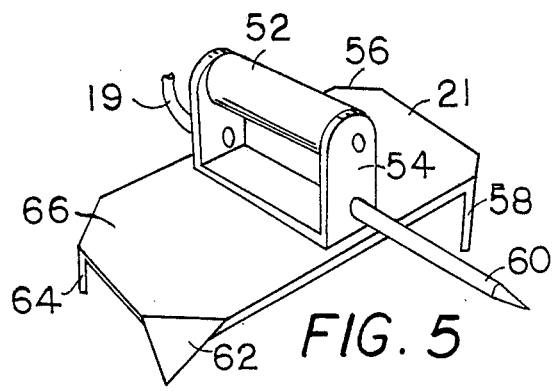
FIG. 5

LIGHTWEIGHT AMPHIBIOUS WATER-ONTO-ICE RESCUE SLED

REFERENCES TO RELATED APPLICATIONS

This is a continuation-in-part of application Ser. No. 07/250,085 filed 9/28/88 entitled Lightweight Amphibious Ice Rescue Sled now abandoned.

BACKGROUND OF THE INVENTION

1. Technical Field

The present invention relates to ice rescues sleds and in partucular to a lightweight amphibious ice rescue sled formèd of an aluminum shell tapered at both ends with built-in bottom runners, an end handle and foam and baffles inside the shell.

2. Description of the Prior Art

Accidents involving individuals, especially children, falling through thin ice take many lives each year, primarily because resue teams are not equipped with a device which moves quickly over ice and through the water and which readily moves from the water back up onto the ice.

Prior art motorized vehicles designed to travel over ice, including hover-type vehicles, are difficult to maneuver in the water for rescue operations. They are also expensive and require a substantial trailer to carry the heavy vehicles to the scene of an accident. Often the terrain does not permit driving a vehicle with a trailer in tow to the scene.

Proir art ice-type sleds are generally quite heavy and cumbersome rquiring considerable effort to carry the sleds and cutting down on the speen of the sleds over the ice making it diffcult or impossible to make the transition from the water to the broken ice and quickly.

Some prior art devices require the rescuer to run over the ice pushing the sled with hazards of slipping or falling into the water through the ice and becoming immobilized because of the heavy load distribution of the feet on the ice.

Many of the prior art devices are thick and bulky and do not permit easy manpulation or propelling of the devices with the rescuer riding on the devices.

Most prior art devices are propelled over the ice by means of ice picks stroking on the ice by hand. The ice picks easily break through thin ice by virtue of their very design. Each stroke in which the pick breaks through the ice the force of the stroke is lost and there is no effective prepulsion through the water, losing momentum and interrupting the forward movement of the device.

DISCLOSURE OF INVENTION

Providing a lightweight amphibious one-person low lying ice sled with runner blades and a nonskid upper surface enables a rescuer to transport the sled easily to any site and ride on the sled in a prone position propelling the sled rapidly over the ice with hand-held multipointed implements, such as ice Grab Paddles, and through the water by paddiling with the hand-held Ice Grab Paddles, using the same strokes and keeping the same pace in the water and on the ice, with uninterrupted forward progress in making the transition from water to ice. The danger of the rescuer falling through the ice and becoming immobilized is eliminated since the amphibious ice sled travels through the water and over the ice with the rescuer on board the sled.

Providing an inverted ramp-like surface forming a narrow horizontal wadge at each end of the amplibious ice rescue sled enables the sled to slide easily from the water up onto the ice in either a forward or rearward direction.

Providing a detachable harness to the front handle of the amphibious ice rescue sled enables the rescuer to secure the victim to the front of the sled by the harness and hauling the victim to safety over the ice.

Providing a light-weight low friction enameled aluminum shell with smell runners and filled with waterproof foam and having waterproof seams creates an amphiblous ice rescue sied which travels easily and rapidly through water and over the ice.

Providing an attached hand-held ice grab and water paddle combining a flat surface, multiple V-shaped points and a long point enables multiple use: through water, over ice and over snow-covered ice as well as making the transition from water onto ice.

Multiple large V-shaped points creete a strong gripping action similar to that of a polar bear's claw enabling sure and rapid gripping action sufficient to pull a loaded human transport device out of water onto ice. Greater force may be exerted with multiple large claws than with a single point without slippage of the claws enabling higher speeds in propelling an amphibious ice rescue sled over ice. Having a number of points spreads out the load to prevent cracking thin ice as opposed to a single ice pick which is actually designed for cracking the ice. A large flat surface area supporting the points serves as a paddle for greater speed through the water and allows an uninterrupted movement of the sled from water onto the ice because of the ability to develop equal speed in water and over the ice.

Providing safety cords secured to the sides of an amphibious ice rescue sled prevents loss of the ice gripping devices while traveling over the ice and enables manipulation of a person in the water by releasing the devices to the hang from the amphibious ice rescue sled while working to save the person.

BRIEF DESCRIPTION OF THE DRAWINGS

These and other details and advantages of my invention will be described in connection with the accompanying drawings, which are furnished only by way of illustration and not in limitation of the invention, and in which drawings:

FIG. 1 is a perspective view showing the top of the amphibious ice sled;

FIG. 2 is a perspective view showing the bottom of the amphibious ice sled;

FIG. 3 is a partial cross-sectional view of the sandwich construction taken through 3—3 of FIG. 1;

FIG. 4 is a partial perspective view showing the connection of a baffle to the bottom and side of the ice sled; and FIG, 5 in a perspective view of the combination ice grab and water paddle normally attached in pairs to the sled.

BEST MODE FOR CARRYING OUT THE INVENTION

In FIG. 1 an amphibious ice rescue sled 10 comprises an elongated thin body slightly longer and slightly wider than an adult having a forward end 13 and a rearward end 25 and thin enough to permit easy manipulation of the sled with a rescuer mounted in a prone position on the sled. At each end a bottom surface is formed into a tapered wedge norrow at the end forming an inverted ramp-like surface 15 and 29. The inverted ramp-like surface slopes away from the bottom surface (FIG. 2) at an angle of approximately thirty degrees to provide a ramp for sliding out of the water onto the ice.

The outer shell of the sled is fromed by two sheets of aluminum; a first sheet forming a top surface 24 and a second sheet forming a bottom 30 and sides 16 by bending the aluminum. The aluminum sheets are enameled to create a smooth sliding surface and increase the resistance to weathering. As seen in FIG. 3, a standing seam is formed between the first and second sheet of aluminum along an intersection of the two sheets by bending an extension of the bottom and side sheet (30, 16) over a bent-up edge 40 of the top sheet to form an upright waterproof edge 18 around the top surface of the outer shell. All other seams are treated with silicone to make the seams waterproof.

As seen in FIG. 4 baffles 50 are spaced evenly within the outer shell each secured to the bottom sheet of metal by rivets 17. Lightweight buoyant waterproof foam 42 is sandwiched between the baffles inside the shell. The foam may be sprayed into the outer shell or cut from solid blocks into pieces which fit tightly withing the outer shell.

Blade-like runners 32 protrude from the bottom of the shell and run along length of the sled. The runners are formed by outwardly bending long narrow protruding ridges longitudinally along the bottom of the sled as seen in FIGS. 2, 3 and 4.

A narrow handrail 20 preferably made of mahogony is attached to each of two sides of the elongated body for carrying the ice sled. Secured to each handrail by a shock cord 19 attached by a removable hook 23, a hand held combination ice grab and water paddle 21 stretches out at arms length from each side of the sled. The rider on the sled uses the combination ice grabs and water paddles to propel the sled over ice and through water with the abillty to maintain constant speed through water or over ice and enabling the sled to move easily from water onto the ice. As seen in FIG. 5 the combination ice grab and water paddle has a large surface area 66 to serve as a paddle in the water and four triangular points 56, 58, 62 and 64 to grip the ice and propel the sled without cracking up the ice as much as a single ice pick does. Grasping the handle 52, the rider of the sled may use the four points over bare ice and the long prong 60 over snow-covered ice. Constant stroks whether over ice or in the water using the combination ice grab and water paddle creates the smooth, ininterrupted, motion necessary to make the otherwise difficult transition from water onto ice.

Attached across the front end of the body by side protrusions 12 a sturdy grasping rail 14 is preferably formed of birch. Attached to the side protrusions 12 by sturdy rings 6 and 9 through the side protrusions, a harness 8 with a snap-hook 7 at both ends may be unsnapped, slung aroud the victim and resnapped to secure the victim to the sled when the victim is unable to hold onto the grasping rail. Attached centrally on the rearward end of the body a rigid means of securing a rope to the reaward end such as a metal ring 26 is riveted to the body. A long strong rope 28 secured to the ring extends rearwardly from the sled back to the shore or base station on solid ice for pulling the sled bock to safety. Skid resistant strips 22 of a coarse textured rubberized material are adhered along the top surface transversely at spaced intervals for retaining a person in a stationary position on the sled without slipping off.

The result is an ultralight buoyant sled with a smooth sliding surface and runners to speed across the ice and move smoothly through water. Relatively high speeds may be obtained by a rescuer lying on the sled and propelling the sled with hand-held pointed implements. Upon reaching the person or animal who fell through the ice the rescuer may instruct the person to hold the grasping rail, help the person to grasp it or secure the harness around the victim. The sled is then pulled by the strong rope back onto safe ice by someone on shore or one safe ice. The rescuer or the saved person or animal may then ride the sled back to the shore for aid.

It is understood that the preceding description is given merely by way of illustration and not in limitation of the invention and that various modifications may be made thereto without departing from the spirit of the invention as claimed.

We claim:

1. An amphibious one-person ice rescue sled comprising:

an elongated body slightly longer than an adult, of approximately shoulder width and thin enough to permit easy manual manipulation and propulsion of the sled with a rescuer mounted in a prone position on the sled, wherein the body has a forward and a rearward end, and wherein at each end a bottom surface is formed into a tapered wedge narrow at the end forming an inverted ramp-like surface;

a thin low friction outer surface of lightweight enamel coated aluminum forming an outer shell around the entire sled;

baffles spaced at intervals transversely within the outer shell;

lightweight buoyant waterproof foam sandwiched between the baffles inside of the shell;

blade-like runners protruding from the shell and running along the length of the sled, wherein the runners are formed by outwardly bending long narrow protruding ridges longitudinally along the bottom of the sled;

a narrow handrail attached to each of two sides of the elongated body, and attached to each handrail by a shock cord, a combination ice grab and water paddle;

attached across the forward end of the body by side protrusions a sturdy grasping rail and attached to the side protrusions a harness cord to encircle a victim;

attached centrally on the rearward end of the body a rigid means of securing a rope to the rearward end;

a long strong rope extending rearwardly from the sled;

on a top surface of the body skid resistant means.

2. The invention of claim 1 wherein the outer shell is formed by two sheets of aluminum, a first sheet of aluminum forming a top surface and a second sheet of aluminum forming a bottom and sides bending the aluminum.

3. The invention of claim 2 wherein a standing seam is formed between the first and second sheet of aluminum along an intersection of the two sheets, wherein an edge of the second sheet overlaps an edge of the first sheet to form the standing seam, which standing seam forms an upright waterproof edge around the top surface of the outer shell.

4. The invention of claim 3 wherein all other seams are treated with silicone to make the seams waterproof.

5. The invention of claim 1 wherein the inverted ramp-like surface slopes away from the bottom surface at an angle of approximately thirty degrees.

6. The invention of claim 1 wherein the skid resistant means comprises strips of coarse textured rubberized material adhered transversely across the top surface of the body at spaced intervals.

7. The invention of claim 1 wherein the foam is sprayed into the outer shell.

8. The invention of claim 1 wherein the foam is cut from solid blocks into pieces which fit tightly within the outer shell.

9. The invention of claim 1 wherein the harness cord comprises a sturdy cord secured to both side protrusions by snap hooks.

10. The invention of claim 1 wherein the combination ice grab and water paddle comprises a rectangular sheet of stainless steel having a flat surface larger than a hand of a user, wherein the sheet of stainless steel is bent at each of four corners to form four ice grabbing points.

* * * * *